United States Patent [19]

Fujimoto et al.

[11] Patent Number: 5,072,631
[45] Date of Patent: Dec. 17, 1991

[54] CONTROL SYSTEM FOR INTERNAL COMBUSTION ENGINE INSTALLED IN VEHICLE WITH AUTOMATIC TRANSMISSION

[75] Inventors: Sachito Fujimoto; Toshitaka Imai, both of Wako, Japan

[73] Assignee: Honda Giken Kogyo Kabushiki Kaisha, Tokyo, Japan

[21] Appl. No.: 580,678

[22] Filed: Sep. 11, 1990

[30] Foreign Application Priority Data

Sep. 12, 1989 [JP] Japan ............... 1-107083[U]

[51] Int. Cl.$^5$ ............................................. B60K 41/06
[52] U.S. Cl. ......................................... 74/860; 74/857
[58] Field of Search ..................................... 74/857–860

[56] References Cited

U.S. PATENT DOCUMENTS

| | | | |
|---|---|---|---|
| 3,791,239 | 2/1974 | Schreiner | 74/860 X |
| 3,792,630 | 2/1974 | Hause | 74/860 |
| 3,913,419 | 10/1975 | Sale et al. | 74/857 |
| 4,290,323 | 9/1981 | Gospodar | 74/860 |
| 4,396,625 | 8/1982 | Latsch et al. | 74/860 X |
| 4,508,088 | 4/1985 | Hasegawa et al. | 74/860 |
| 4,520,694 | 6/1985 | Eschrich et al. | 74/857 |
| 4,596,164 | 6/1986 | Hasegawa et al. | 74/859 X |
| 4,685,548 | 8/1987 | Holtermann et al. | 74/857 X |
| 4,724,723 | 2/1988 | Lockhart et al. | 74/857 X |
| 4,760,823 | 8/1988 | Yasuoka et al. | 74/860 |
| 4,924,832 | 5/1990 | Abe | 74/860 X |
| 4,933,851 | 6/1990 | Ito et al. | 74/857 X |
| 4,938,100 | 7/1990 | Yoshimura et al. | 74/860 |

*Primary Examiner*—Dwight Diehl
*Attorney, Agent, or Firm*—Armstrong, Nikaido, Marmelstein, Kubovcik & Murray

[57] ABSTRACT

A control system for internal combustion engine installed in vehicle with automatic transmission which lowers the engine output torque for reducing the shock apt to be felt by the passengers of a vehicle equipped with an automatic transmission at the time of shifting gears. The clutch speed ratio between the transmission input and output shafts is calculated to compare with a first value. If the ratio goes beyond the first value, engine output torque is reduced by a first amount. Then the ratio is compared with a second value and if the ratio comes within the second value, the torque is further reduced by a second amount which is greater than the first amount. The ratio is continuously calculated and is again compared with a third value. When the ratio comes within the value, the torque is restored to the first reduction amount. The ratio is finally compared with the fourth value and if it comes within the value, the torque is fully restored to the initial state. Thus, the gear shift shock is avoided and as a secondary effect, clutch wear is reduced.

9 Claims, 7 Drawing Sheets

| GEARS | 1st | 2nd | 3rd | 4th |
|---|---|---|---|---|
| GEAR RATIO $eGn$ | $eG1 = \dfrac{C1}{M1}$ | $eG2 = \dfrac{C2}{M2}$ | $eG3 = \dfrac{C3}{M3}$ | $eG4 = \dfrac{C4}{M4}$ |
| CLUTCH SPEED RATIO (SLIP RATE) $eCLn$ | $eCL1 = \dfrac{NC}{NM} \times eG1$ | $eCL2 = \dfrac{NC}{NM} \times eG2$ | $eCL3 = \dfrac{NC}{NM} \times eG3$ | $eCL4 = \dfrac{NC}{NM} \times eG4$ |

| GEARS | ΔA | ΔB | ΔC | ΔD |
|---|---|---|---|---|
| 1st | 0.05 | 0.10 | 0.20 | 0.15 |
| 2nd | 0.12 | 0.13 | 0.25 | 0.18 |
| 3rd | 0.07 | 0.15 | 0.27 | 0.20 |
| 4th | 0.10 | 0.14 | 0.30 | 0.21 |

CONTROL SYSTEM FOR INTERNAL COMBUSTION ENGINE INSTALLED IN VEHICLE WITH AUTOMATIC TRANSMISSION

BACKGROUND OF THE INVENTION

1. Field of the Invention

This invention relates to a control system for an internal combustion engine installed in a vehicle equipped with an automatic transmission, and more particularly to such a system which lowers the engine output for reducing the shock apt to be felt by the passengers of a vehicle equipped with an automatic transmission at the time of shifting gears.

2. Description of the Prior Art

The passengers of a vehicle equipped with an automatic transmission are apt to experience an unpleasant shock when torque is reapplied to the power train in the course of a transmission gear shift operation. Japanese Laid-open Patent Publication No. 55(1980)-69738 discloses a system for alleviating this shock by lowering engine output during the gear shift operation. A system for this purpose has also been proposed by the assignee and applied for patent under Japanese Patent Application No. 62(1987)-336666 (laid open under the number of 1(1990)-178736, which was filed with the United States and was patented under the number of U.S. Pat. No. 4,889,014).

In the system of this earlier application, the power transmission state of the power transmission means, e.g. the speed ratio between input and output sides of the clutch, is monitored and the engine output is immediately lowered when the clutch slip rate comes to exceed a prescribed limit, irrespective of whether the cause is gear shifting or an abnormality of the clutch. If the increased clutch slip rate is the result of a gear shifting operation, the output of the engine is restored once the state of power transmission has come within prescribed limits set in view of the target gear position so that gear shift shock is avoided and clutch wear is reduced.

However, the reduction in engine output required for protecting the clutch in the case of slip is not necessarily the same as that appropriate for avoiding gear shift shock in either amount or range. The system proposed earlier by the assignee did not take this fact into consideration but lowered the torque by the same amount in both cases. Depending on the driving conditions, therefore, the passengers were likely to experience a degraded driving feeling, specifically a sensation of power deficiency or deceleration.

SUMMARY OF THE INVENTION

In view of the foregoing, one object of the present invention is to provide a control system for an internal combustion engine installed in a vehicle with an automatic transmission which overcomes the aforesaid problems of the conventional systems.

Another object of the invention is to provide such a system which provides a different amount of control between the case where clutch slip arises because of a gear shifting operation and the case where such slip arises owing to some other cause as wear or the like, whereby it is possible simultaneously to avoid gear shift shock without degrading the feeling experienced by the passengers during gear shifting and to protect the clutch.

This invention achieves these objects by providing a system for controlling an internal combustion engine installed in a vehicle with automatic transmission, comprising a first device for detecting torque transmission state of the vehicle transmission, a second device for comparing the detected value with a first reference value, the second device reducing the engine output torque by a first amount when the detected value is found to be out of the first reference value, and a third device for comparing the detected value with a second reference value, the third device reducing, when the detected value is found to come within the second reference value, the engine output torque by a second amount which is greater than the first amount.

DETAILED DESCRIPTION OF THE INVENTION

The invention will now be explained with reference to specific embodiments of the control system for an internal combustion engine installed in a vehicle with an automatic transmission according to this invention.

Figure 1:
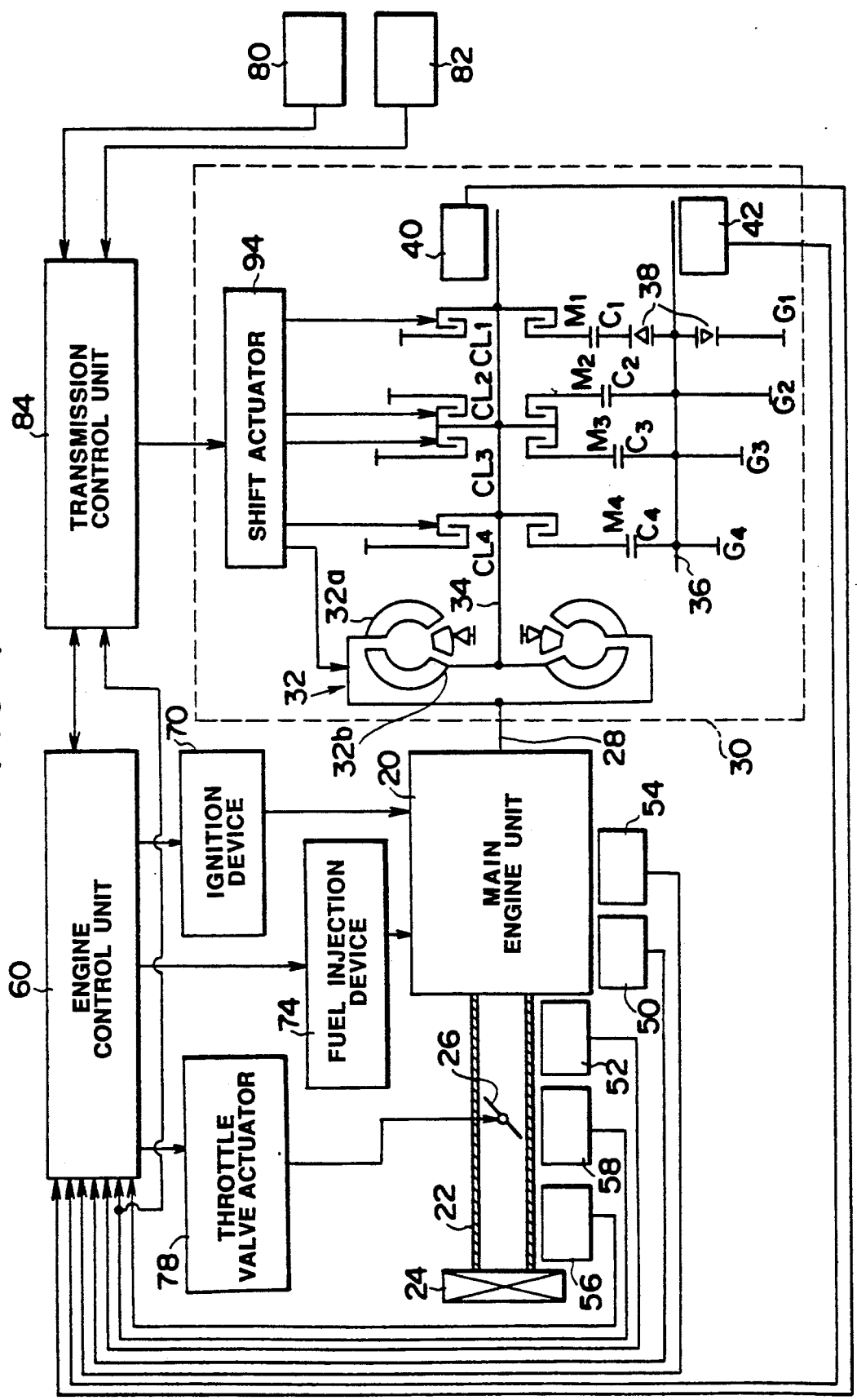
FIG. 1 is a schematic view showing the overall arrangement of a control system for an internal combustion engine installed in a vehicle with an automatic transmission in accordance with this invention.

Referring to FIG. 1, which shows the overall arrangement of a system according to the invention, reference numeral 20 designates the main unit of an internal combustion engine. Extending from the main engine unit 20 is an air intake passage 22 having an air cleaner 24 at its distal end. Air drawn in through the air cleaner 24 passes through the air intake passage 22 to the main engine unit 20 while having its flow rate adjusted by a throttle valve 26 linked with and operated by an accelerator pedal (not shown) situated on the vehicle floor in front of the driver's seat. The part of the air intake passage 22 in the vicinity of the combustion chambers (not shown) is provided at an appropriate location with a fuel injector (not shown) which supplies fuel to the air intake passage 22. The intake air and the fuel are mixed and the resulting air-fuel mixture enters the individual combustion chambers where it is compressed by associated pistons (not shown). After it is compressed in a combustion chamber, the fuel-air mixture is ignited by a spark plug (not shown), whereupon it burns explosively and drives down the piston. The driving force of the piston is converted into rotating motion and is output from an engine output shaft 28.

The stage following the main engine unit 20 is a power transmission section 30. For making the arrangement of the power transmission section 30 easier to understand, it is represented in the form of power flow diagram. The engine output shaft 28 is connected with a torque converter 32 of the power transmission section 30 and is linked with a pump impeller 32a thereof. The turbine runner 32b of the torque converter 32 is connected with a main shaft 34 constituting the input shaft of the transmission. In the present invention, the main shaft 34 has a single countershaft 36, constituting the transmission output shaft, disposed in parallel therewith. Between the two shafts are provided a first gear G1, a second gear G2, a third gear G3, a fourth gear G4 (for the sake of simplicity, no reverse gear or the like is shown in the figure). These gears are respectively provided with multi-plate clutches CL1, CL2, CL3 and CL4. The first gear G1 is further provided with a one-way clutch 38. The symbols M1 to M4 and the symbols C1 to C4 in the figure respectively indicate the number of gear teeth on the main shaft side and the number of teeth on the countershaft side. A first position sensor 40 is provided on the main shaft 34 and is arranged to output a signal once every prescribed angle of rotation of the transmission input shaft. A second position sensor 42 is provided on the countershaft 36 for outputting a transmission output shaft rotation angle signal.

A crankshaft sensor 50 comprising a magnetic pickup or the like mounted on a rotary member of a distributor (not shown) or the like is provided in the vicinity of the main engine unit 20 for detecting the crank angle position of the pistons and outputting a signal once every prescribed crank angle. In addition, a manifold absolute pressure sensor 52 is provided at an appropriate position on the air intake passage 22 for enabling detection of the engine load state in terms of the intake air pressure. Further, a coolant temperature sensor 54 is provided at a cooling water passage (not shown) of the main engine unit 20 for detecting the engine temperature, a manifold air temperature sensor 56 is provided at an appropriate position on the air intake passage 22 for detecting the temperature of the intake air, and a throttle position sensor 58 constituted as a potentiometer or the like is provided in the air intake passage 22 in the vicinity of the throttle valve 26. The outputs of the sensors 50, 52, 54, 56, 58 and the first and second sensors 40, 42 are sent to an engine control unit 60.

Figure 2:
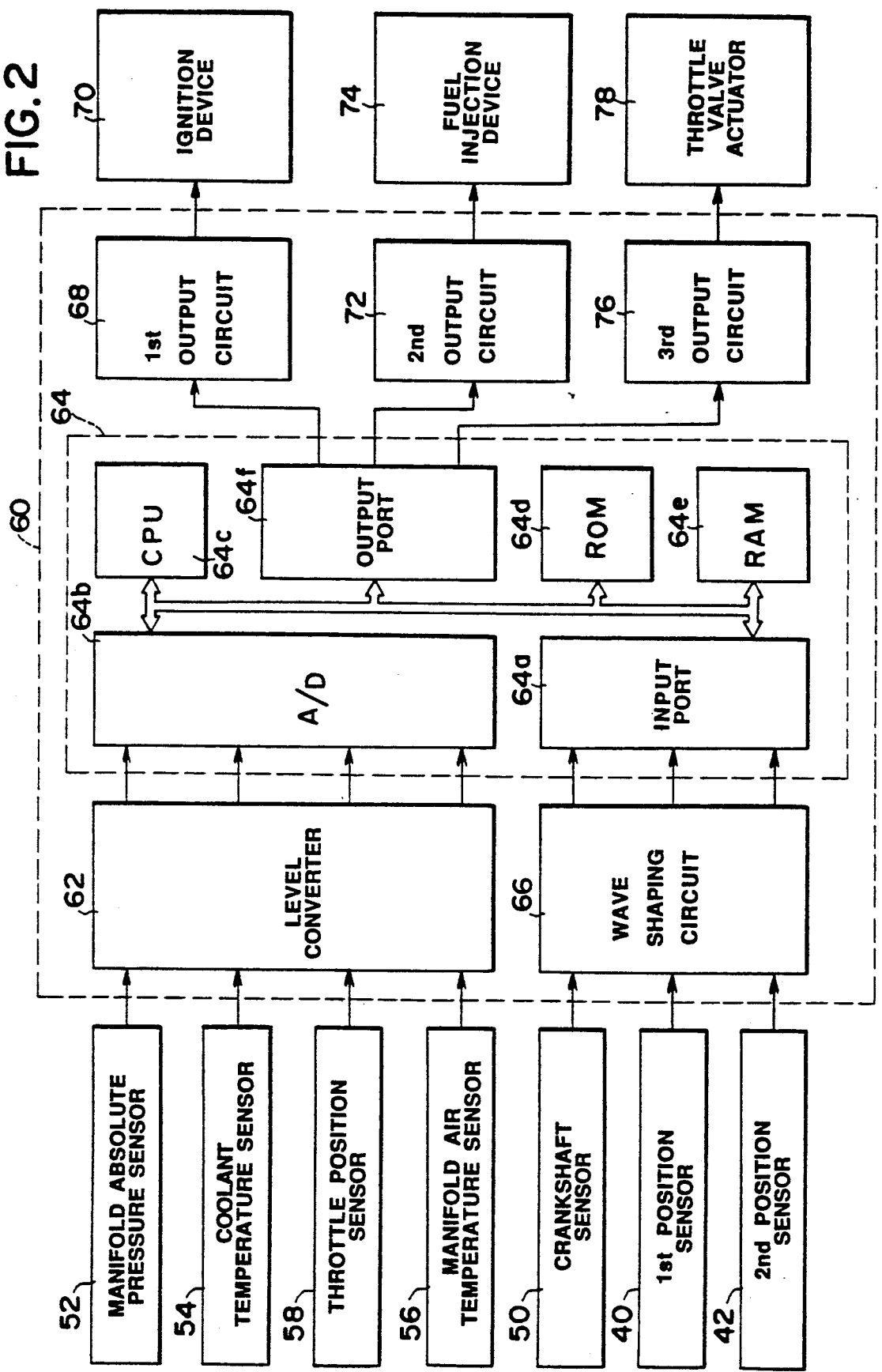
FIG. 2 is a block diagram showing details of the engine control unit of the system of FIG. 1.

The arrangement of the engine control unit 60 is illustrated in the block diagram of FIG. 2. As shown in this figure, the outputs of the manifold absolute pressure sensor 52, the coolant temperature sensor 54, the manifold air temperature sensor 56 and the throttle position sensor 58 sent to the engine control unit 60 are first input to a level converter 62 in which they are amplified to an appropriate level and then sent to a microcomputer 64. The microcomputer 64 comprises an input port 64a, an A/D converter 64b, a CPU (central processing unit) 64c, a ROM (read-only memory) ROM 64d, a RAM (random access memory) 64e, an output port 64f, a flag register and an interrupt time counter (the last two mentioned members not being shown). The output from the level converter 62 is input to the A/D converter 64b and the digital result is temporarily stored in the RAM 64e. The outputs of the first position sensor 40, the second position sensor 42 and the crank angle sensor 50 are input to a wave shaping circuit 66 of the engine control unit 60 and after being wave shaped are forwarded to the input port 64a of the microcomputer 64 and then temporarily stored in the RAM 64e. The CPU 64c uses these input signals for calculating the engine speed and the speed (rotation number) of the transmission input shaft. In the microcomputer 64, the CPU 64c uses the input values and the calculated values for calculating engine operation control values in accordance with commands stored in the ROM 64d.

In this embodiment, three types of control values are calculated: the ignition timing, the amount of fuel injection and the throttle valve opening. The ignition timing is obtained by first retrieving a basic ignition timing from a basic timing map stored in the ROM 64d using the engine speed and the intake air pressure as address data and then correcting this basic ignition timing based on the outputs of the coolant temperature sensor etc. so as to obtain the final ignition timing, which is then forwarded through a first output circuit 68 to drive an ignition device 70, which may be an igniter or the like, so as to cause a spark plug to ignite the air-fuel mixture in the associated combustion chamber. On the other hand, the amount of fuel to be injected is determined by retrieving a basic injection amount from a similar map again using the engine speed and the intake air pressure as address data and then calculating a correction value that is added to the retrieved value to obtain the final injection amount. A corresponding signal is then sent through a second output circuit 72 to a fuel injection device 74 which causes fuel to be injected through the aforesaid fuel injector. The fuel injection device 74 comprises a solenoid valve and associated drive circuitry. The amount of fuel injected is adjusted by controlling the duty ratio of the solenoid valve so as to vary the injection time. In this embodiment of the control system, the throttle valve 26 is arranged so that its degree of opening can, under predetermined operating conditions, be varied independently of the operation of the accelerator pedal. Under the predetermined operating conditions, the microcomputer 64 calculates a control value which is outputs to a throttle valve actuator 78 through a third output circuit 76. The throttle actuator circuit 78 comprises a stepper motor and associated drive circuitry and the throttle valve 26 is driven in the appropriate direction independently of the position to which the accelerator pedal has been depressed.

Figure 3:
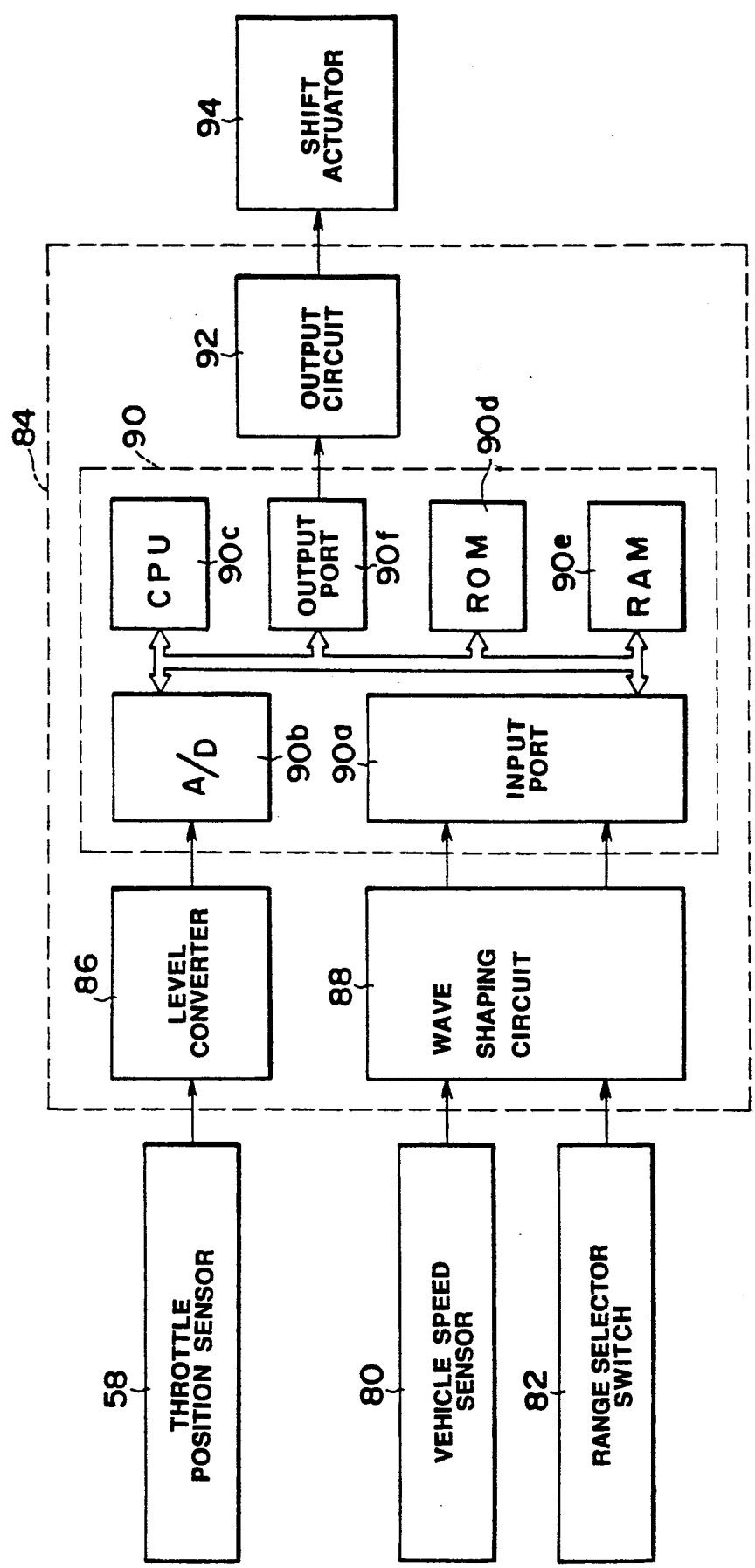
FIG. 3 is a block diagram showing details of a transmission control unit of the system of FIG. 1.

Returning to FIG. 1, a vehicle speed sensor 80 for producing a signal indicating the vehicle speed is provided at an appropriate position in the vicinity of the power transmission section 30, and a range selector switch 82 is provided for detecting the position of a range selector lever (not shown) on the floor of the vehicle near the driver's seat. The outputs from the sensor 80, the switch 82 and the throttle position sensor 58 are sent to a transmission control unit 84 which is shown in the block diagram of FIG. 3. As can be seen in this figure, the transmission control unit 84 has generally the same arrangement as the engine control unit 60. The output of the throttle position sensor 58 is input to a second microcomputer 90 through a level converter 86 and an A/D converter, while the outputs of the vehicle speed sensor 80 and the range selector switch 82 are input to the same microcomputer through a wave shaping circuit 88 and an input port 90a. These inputs are stored in a RAM 90e of the second microcomputer 90. The CPU 90c of the second microcomputer 90 calculates a control value using a shift pattern stored in its ROM 90d and outputs a shift command to a shift actuator 94 through an output port 90f and an output circuit 92. The shift actuator 94 comprises a solenoid shift valve drive circuit and appropriately drives the solenoid valve in accordance with the command value so as to discontinue the supply of hydraulic pressure to the clutch of the currently engaged gear and to begin supplying hydraulic pressure to the next gear so as to shift gears. The gear shift control unit 84 and the engine control unit 60 are arranged so that signals can be exchanged therebetween through a communications interface (not shown). While this embodiment of the control system is provided with both the second position sensor 42 at the output shaft of the transmission and the vehicle speed sensor 80, either of these can be eliminated and the remaining one can serve the function of both.

Figure 4:
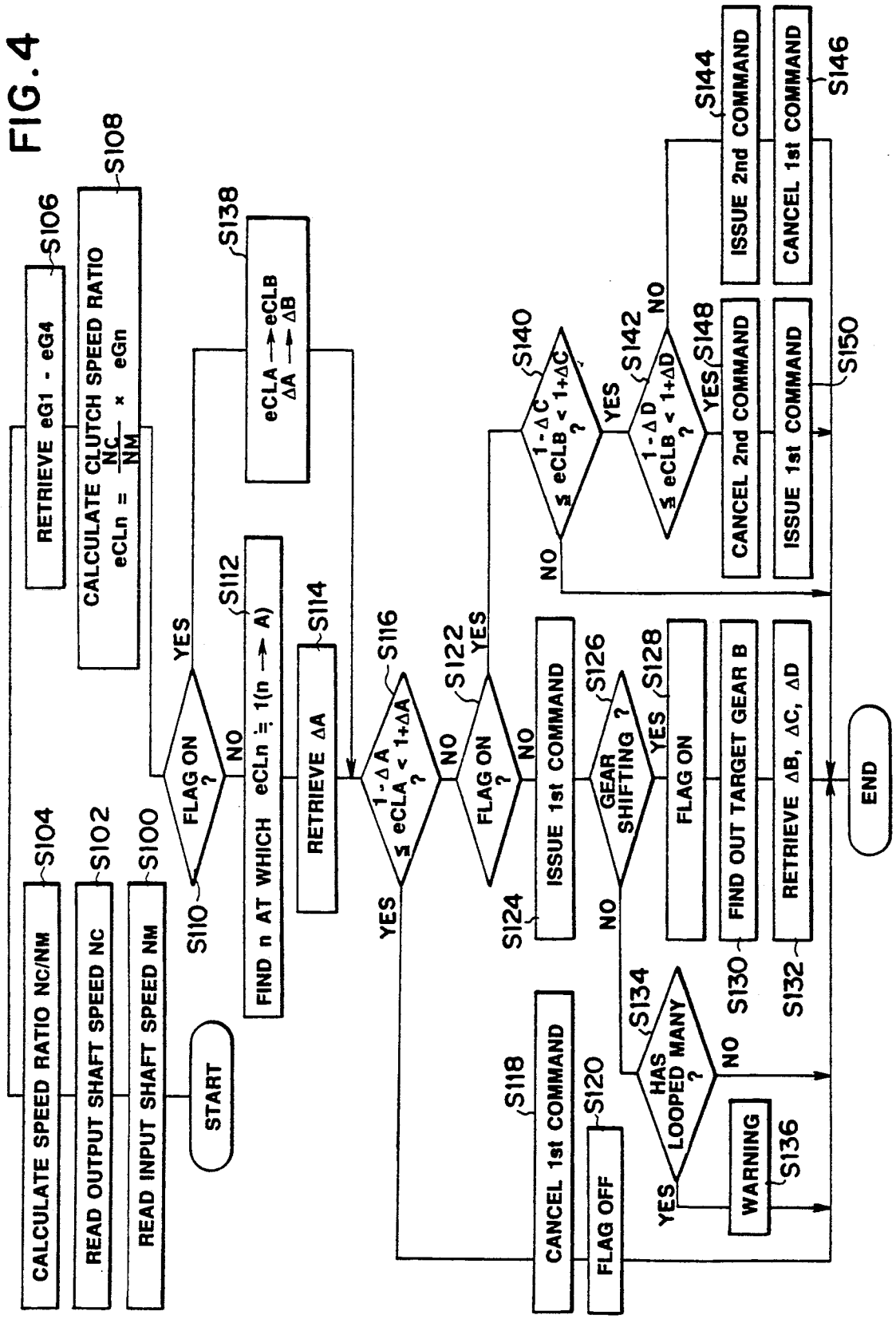
FIG. 4 is a flowchart of the operations of the control system according to this invention.

The operation of this embodiment will now be explained with reference to FIG. 4. The operation of the system is controlled by the engine control unit 60 and the program shown in FIG. 4 is restarted once every prescribed time interval (e.g. once every 30 ms.) or once every prescribed crank angle.

The program begins with step S100 in which the transmission input shaft speed $N_M$ is calculated from the output of the first position sensor 40. The procedure then advances to step S102 in which the transmission output shaft speed $N_C$ is calculated from the output of the second position sensor 42 and then to step S104 in which ratio between these two speeds is calculated as $$Speed\ ratio = N_C/N_M$$

Figures 5, 6:
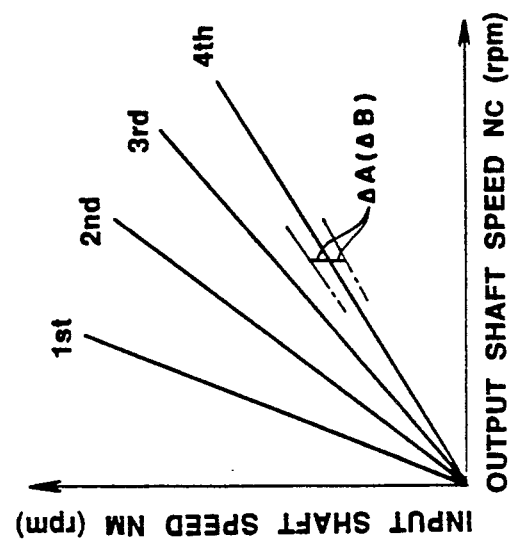
FIG. 5 is a table for explaining the gear ratio and clutch speed ratio used in the flowchart of FIG. 4.
FIG. 6 is a graph for explaining the ratio between the speeds of the transmission input and output shafts at each gear position.

In the following step S106, the gear ratios eG1 to eG4 for the respective gears are retrieved from the ROM 64d. These gear ratios eGn are calculated in advance as shown in FIG. 5 from the number of gear teeth Mn of the gears on the main shaft side and the number of teeth Cn of the gears on the countershaft side and the calculated values are stored in the ROM 64d.

The procedure then moves to step S108 in which the clutch speed ratio (slip rate) eCLn is calculated for each of the four gears and then to step S110 in which it is confirmed whether a flag (to be explained later) is off before moving to step S112 in which the one of the four calculated clutch speed ratios which is nearest in value to unity is selected and the corresponding gear is determined being the current gear (hereinafter referred to as "A"). More specifically, as shown in FIG. 6, the speed ratio between the input and output shafts differs among the different gear positions. Since the clutch speed ratios are obtained as the product of these speed ratios and the gear ratios of the corresponding gear positions, the clutch speed ratio of the engaged gear should be approximately 1. Thus it is possible to find the currently engaged gear by finding the gear for which the clutch speed ratio is approximately unity. After the current gear position has been discriminated in step S112, the procedure advances to step S114 in which a discrimination value Delta A is retrieved. As shown in conjunction with the input-output shaft speed ratio characteristics shown in FIG. 6, this discrimination value Delta A is for discriminating the boundary beyond which the clutch slip comes to exceed a prescribed range after the engaged clutch begins to be disengaged. It is thus a value for discriminating the point from which control for lowering engine output is necessary. This value, along with Delta B and other values to be explained later, are experimentally determined beforehand and stored in the ROM 64d of the microcomputer 64.

The procedure then moves to step S116 in which it is determined whether or not the clutch speed ratio is outside the prescribed range (i.e. 1±Delta A) and if it is found to be within the prescribed range, this is interpreted to mean either that the gear concerned is engaged or that it is in the processes of disengaging but has not yet reached the point where measures are required for coping with gear shift shock. The program is therefore ended without lowering the engine output (S118). Moreover, in this case if the engine output has been lowered in the manner to be explained later, its output is restored at this time and the program is concluded after the aforesaid flag is turned off at step S120.

If the clutch speed ratio eCLA is found to be outside the prescribed range in step S116, the procedure moves to step S122 in which it is determined whether or not the aforesaid flag is on. Since, as will be explained later, this flag indicates that control for lowering the engine output has been started, the flag will be found to be off so that the procedure moves to step S124 in which the first output reduction command is issued. As will be explained later, this command is issued for protecting the clutch and the amount by which the output is reduced is relatively small. The procedure then advances to S126 in which signals are exchanged with the gear shift control unit 84 for learning whether or not gear shifting is being carried out and if it is found that gear shifting is being conducted, the procedure moves to step S128 in which the flag indicating the start of control for lowering engine output is turned on, to step S130 in which the target gear B is discerned by exchanging signals with the transmission control unit 84 and then to step S132 in which discrimination values Delta B, C and D (to be explained later) are retrieved from the ROM 64d. In this control, the engine output is lowered even in the case where in step S126 it has been confirmed by an exchange of information with the transmission control unit 84 that no gear shift command has been issued. Thus the clutch is also protected from further damage in the case where it is slipping due to wear or deterioration. In step S134, the number of times this loop has been repeated is counted and when the number of loops becomes greater than a prescribed value, a fail-safe operation is initiated in which a warning is issued in a predetermined form (S136).

After engine output reduction has once been implemented in step S124, it will be found in step S110 of the following and later cycles of the program that the flag is on, in which case the procedure moves from step S110 to step S138 in which the current gear position Delta A and the associated discrimination value A are replaced by the target gear position B and its associated discrimination value Delta B and then to step S116 in which the degree of engagement of the target gear is determined. In this case, since the current gear position has just been left, the result of this determination will be negative so that the procedure will first move to step S122 in which the flag will be found to be on, and then to step S140. In step S140 and the following step S142, the degree of clutch slip is determined in two different zones using the aforesaid discrimination values Delta C and Delta D. This will be understood from the following general explanation of the control according to this invention made with respect to FIG. 7.

Referring to FIG. 7(a), at the time the clutch speed ratio eCLA of the current gear position is found to be out of the range of 1±Delta A, the first output reduction command is issued. Thereafter the clutch speed ratio of the target gear position is monitored and when it comes within the range of 1±Delta C, the first output reduction is discontinued and the second output reduction command is issued. This second output reduction is larger than the first output reduction. Monitoring of the clutch speed ratio of the target gear position is continued and when the gradually diminishing clutch speed ratio of the target gear position has come within the range of 1±Delta D, the second output reduction command is retracted and the first output reduction command is reissued, causing a switch from decreasing engine output to increasing engine output. Following this, when the clutch speed ratio has diminished to the point of coming within the range of 1±Delta B in the vicinity of the target gear position B, the first output reduction command is retracted and the initial engine output is restored.

Figure 7:
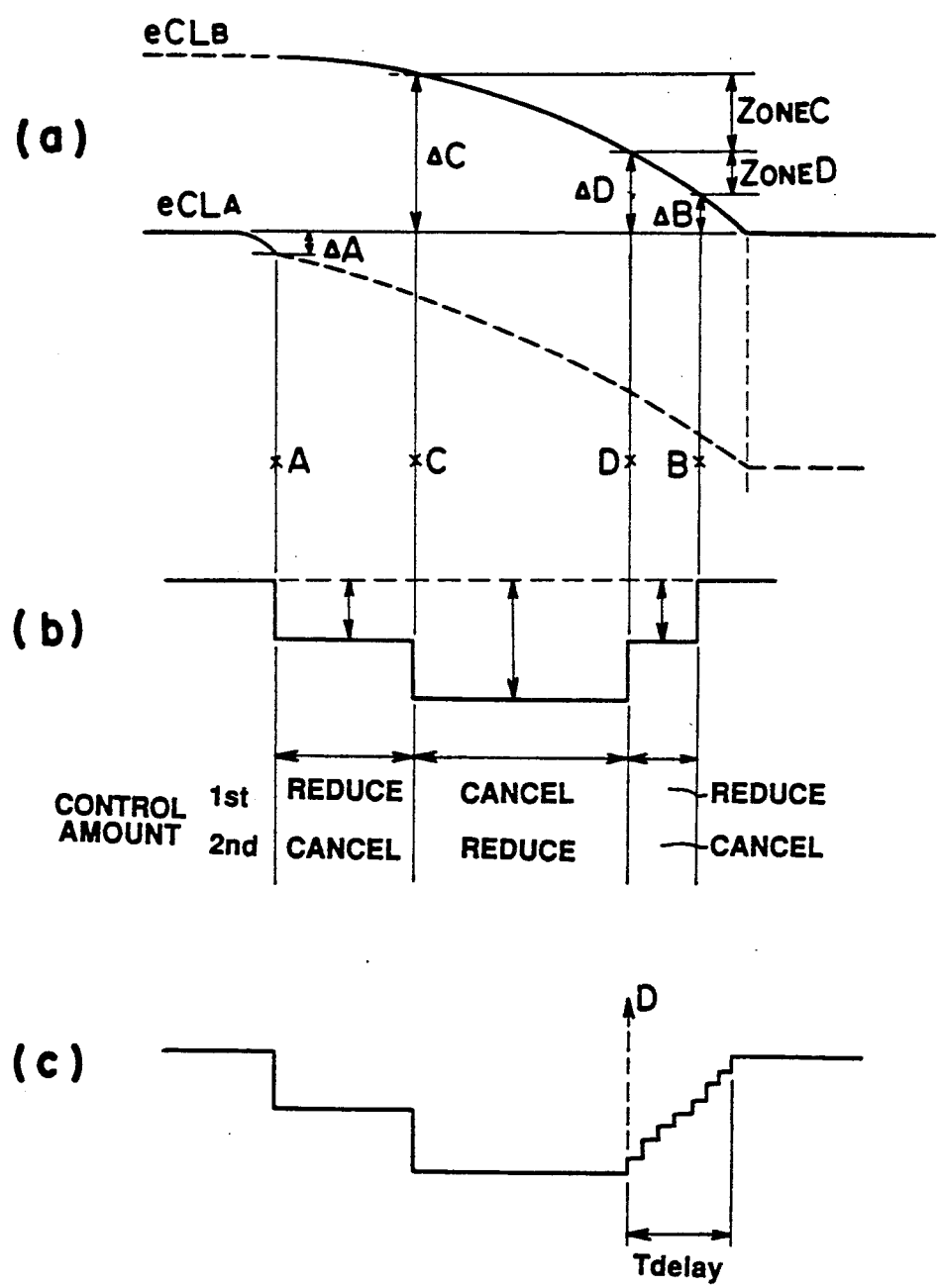
FIGS. 7(a), (b) and (c) are timing charts schematically indicating the control operation according to the system of this invention.
Figures 8, 9:
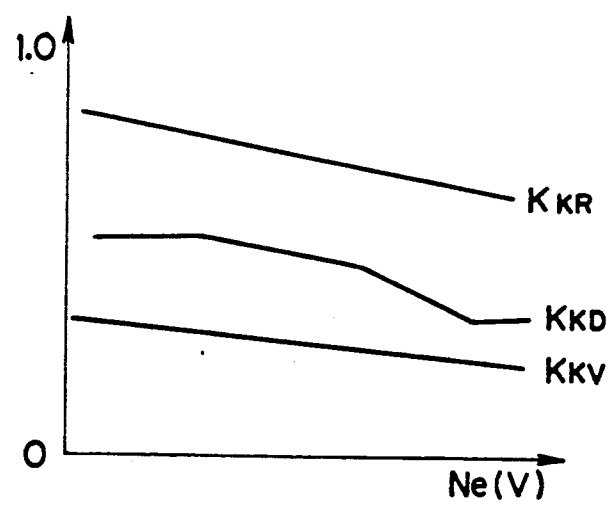
FIG. 8 is a table for explaining discrimination values used for discriminating clutch slip degrees.
FIG. 9 is a graph showing the characteristics of a correction coefficient for calculating the amount by which the engine output is to be lowered.

In other words, the engine output is lowered by the first control amount when the clutch first begins to slip (phase A in FIG. 7). Since at this initial stage of clutch slip there is no need yet to reduce the engine output for coping with gear shifting, it suffices to take measures only for clutch protection. Therefore, the amount of output reduction is held to a relatively small amount adequate for protecting the clutch. Then after the amount of clutch slip has become relatively large (zone C), a larger second reduction amount is implemented. Since the large amount of clutch slip at this time indicates that engine output control for coping with gear shifting has become necessary, the amount of reduction is made larger than the first reduction amount. With this arrangement, it becomes possible to avoid gear shift shock without giving the passengers an impression of deceleration, while simultaneously protecting the clutch. The succeeding zone D is a preparatory one for restoring the engine output. Since the engagement of the target gear progresses in this stage, the reinstatement of the first reduction amount at this time helps to facilitate a smooth transition to full restoration of the engine output in the following stage (phase B) and, as a result, the vehicle passengers experience a smooth accelerating sensation during gear shift, with no feeling of there being a pause in the acceleration process. FIG. 8 shows the discriminating values.

The first and second engine output reduction amounts are produced by, for example, retard adjustment of the ignition timing $\theta_{ig}$. Specifically, the retarded ignition timing is calculated as Retarded ignition timing $\theta_{ig}$ = Ignition timing $\theta_{ig}$ × Coefficient K The characteristics of the retard coefficient K are shown in FIG. 9. In this figure
$K_{KR}$ = Coefficient for clutch protection
$K_{KD}$ = Coefficient for coping with gear shift shock (during shift down)
$K_{KU}$ = Coefficient for coping with gear shift shock (during shift up)

Here $K_{KR}$ corresponds to the first engine output reduction amount (command) and $K_{KD}$ and $K_{KU}$ correspond to the second engine output reduction amount (command). The selection between $K_{KD}$ and $K_{KU}$ is made on the basis of whether the target gear is a higher or lower gear than the current gear. As shown, these coefficients are established as a function of the engine speed $N_e$ or the vehicle speed V. The reason for this is that the output torque varies with the engine speed and the vehicle speed.

Returning to FIG. 4, it is determined in step S140 whether or not the degree of clutch slip has entered zone C and if the result is affirmative, the procedure moves to step S142 in which it is determined whether or not it has entered zone C. If this is the first entry into zone C, the determination in step S142 will be negative and the procedure will move to step S144 in which the second output reduction command is issued and then to step S146 in which a command canceling the first output reduction command is issued. On the other hand, if the determination in step S142 is affirmative, since this means a transition from zone C to zone D, the procedure advances to step S148 in which a command canceling the second output reduction command is issued and then to step S150 in which the first output reduction command is issued. In succeeding cycles of the program, when it is found in step S116 that the degree of engagement of the target gear has become high, the procedure moves to step S118 in which a command canceling the first output reduction command is issued, thus restoring the initial engine output, and then to step S120 in which the flag is turned off, bringing the program to a conclusion.

In the case where clutch wear causes the engine output to be lowered by the first reduction amount, the reduction in output will promptly cause the amount of clutch slip to diminish to within the prescribed range and, while a gear shift operation will not be carried out, the determination in step S116 will at any rate be affirmative so that the procedure will move to step S118 in which engine output will be restored, thus preventing further clutch wear. A secondary effect of the present invention is that the reduction of the engine output implemented at the time the clutch begins to slip, irrespective of whether or not the slipping is caused by gear shifting, makes it possible to prevent unnecessary waste of energy.

In this embodiment of the invention two discrete engine output reduction amounts are established: a relatively small one adequate for protecting the clutch when it first begins to slip and a large one implemented when a large lowering of the engine output is required for coping with gear shift shock. It is thus possible to conduct smooth gear shift operation without giving the passengers a feeling of power deficiency or deceleration and also to prevent gear shift shock effectively while simultaneously protecting the clutch. The invention also provides secondary effects in that lowering of the engine output whenever the clutch begins to slip, even though the cause may not be gear shifting, works to eliminate unnecessary waste of energy, and in that the constant monitoring of the power transmission state that is carried out makes it possible to respond promptly to any abnormality that might occur.

FIG. 7(c) is a diagram relating to a second embodiment of the invention in which the engine output is gradually restored beginning from the time of entry into zone D. With this arrangement the feeling of a pause in the acceleration process can be even more thoroughly eliminated and the engine output can be increased gradually with increasing engagement of the target gear, so that the passengers will experience an even smoother gear shift feeling. In this case it is preferable to restore the output gradually over a prescribed time period $T_{delay}$ starting from the point of entry into zone D. Namely, in view of the characteristics of the hydraulic pressure during gear shift, it is more effective to make the gradual restoration of output dependent on time than to make it dependent on crank angle.

While the embodiments explained in the foregoing rely on adjusting the ignition timing for lowering the engine output, the invention is not limited to this and it is alternatively possible to reduce the output by controlling fuel injection or throttle opening.

The present invention has thus been showed and described with reference to the specific embodiments. However, it should be noted that the present invention is in no way limited to the details of the described arrangements but changes and modifications may be made without departing from the scope of the appended claims.

What is claimed is:

1. A system for controlling an internal combustion engine installed in a vehicle with automatic transmission, comprising:
    first means for detecting torque transmission state of the vehicle transmission and for outputting a detected value;
    second means for comparing the detected value with a first reference range, the second means reducing the engine output torque by a first amount when the detected value is found to be outside of the first reference range; and
    third means for comparing the detected value with a second reference range, the third means for further reducing the engine output torque by a second amount which is greater than the first amount when the detected value is found to be within the second reference range.

2. A system according to claim 1, further including fourth means for comparing the detected value with a third reference range, the fourth means restoring the engine output torque when the detected value is found to be within the third reference range.

3. A system according to claim 2, wherein said fourth means compares the detected value with a fourth reference range and restores the engine output torque by the second amount, the fourth means further restoring the engine output torque to an initial state when the detected value is found to be within the third reference range.

4. A system according to claim 2, wherein said fourth means restores the engine output torque gradually with respect to time when the detected value is found to be within the third reference range.

5. A system according to claim 3, wherein said fourth means restores the engine output torque gradually with respect to time when the detected value is found to be within the fourth reference range.

6. A system according to any of preceding claims 1-4 or 5, said first means detects a torque transmission state through a ratio of transmission input and output shaft rotation.

7. A system according to any of preceding claims 1-4 or 5, wherein engine output torque is reduced or restored through, solely or in combination, an ignition timing, a fuel injection amount and an opening degree of a throttle valve.

8. A system for controlling an internal combustion engine installed in a vehicle with automatic transmission, comprising:
    first means for detecting torque transmission state of the vehicle transmission;
    second means for comparing the detected value with a first reference range, the second means reducing the engine output torque by a first amount when the detected value is found to be outside of the first reference range;
    third means for comparing the detected value with a second reference range, the third means reducing, when the detected value is found to be within the second reference range, the engine output torque by a second amount which is greater than the first amount; and
    fourth means for comparing the detected value with a third reference range, the fourth means restoring the engine output torque when the detected value is found to be within the third reference range, said fourth means compares the detected value with a fourth reference range and restores the engine output torque by the second amount, the fourth means further restoring the engine output torque to an initial state when the detected value is found to be within the third reference range.

9. A system according to claim 8, wherein said fourth means restores the engine output torque gradually with respect to time when the detected value is found to be within the fourth reference range.

* * * * *